US007156328B2

(12) United States Patent
Samaha

(10) Patent No.: US 7,156,328 B2
(45) Date of Patent: Jan. 2, 2007

(54) SYSTEM AND METHOD FOR DETERMINING A PIVOT CENTER AND RADIUS BASED ON A LEAST SQUARES APPROACH

(75) Inventor: Alain Samaha, Mountain View, CA (US)

(73) Assignee: Trimble Navigation Ltd., Sunnyvale, CA (US)

( * ) Notice: Subject to any disclaimer, the term of this patent is extended or adjusted under 35 U.S.C. 154(b) by 118 days.

(21) Appl. No.: 11/021,335

(22) Filed: Dec. 22, 2004

(65) Prior Publication Data

US 2006/0131450 A1 Jun. 22, 2006

(51) Int. Cl.
*B05B 3/00* (2006.01)
*B05B 3/18* (2006.01)
*G01S 1/00* (2006.01)

(52) U.S. Cl. .................. 239/728; 239/735; 239/739; 239/742; 701/213; 702/150; 342/357.06

(58) Field of Classification Search ............. 239/728, 239/735, 739, 742, 722, 723, 726, 729, 743, 239/750; 701/213; 702/150; 342/357.06, 342/357.08

See application file for complete search history.

(56) References Cited

U.S. PATENT DOCUMENTS

| 5,822,213 | A  | * | 10/1998 | Huynh ........................ 700/213 |
| 5,927,603 | A  | * | 7/1999  | McNabb ....................... 239/63 |
| 6,469,628 | B1 | * | 10/2002 | Richards et al. .......... 340/573.3 |
| 6,633,256 | B1 | * | 10/2003 | Zhdanov et al. ........ 342/357.17 |
| 6,666,384 | B1 | * | 12/2003 | Prandi ............................ 239/1 |
| 6,816,117 | B1 | * | 11/2004 | Fink et al. ................... 342/464 |
| 6,928,339 | B1 | * | 8/2005  | Barker ........................ 700/284 |

\* cited by examiner

*Primary Examiner*—David A. Scherbel
*Assistant Examiner*—Darren Gorman
(74) *Attorney, Agent, or Firm*—Crowell & Moring LLP

(57) ABSTRACT

A system and method for determining the center and radius based on a least squares approach is disclosed. In one embodiment, a farmer drives through a given arc of a circular field in question and periodically takes position measurements. In another embodiment, a Least-Squares Algorithm is used to estimate the best-fitting center and radius given the set of position measurements input by the farmer.

31 Claims, 5 Drawing Sheets

SYSTEM AND METHOD FOR DETERMINING A PIVOT CENTER AND RADIUS BASED ON A LEAST SQUARES APPROACH

BACKGROUND OF THE INVENTION

1. Field of the Invention

The present invention relates in general to a system and method for determining a pivot center and radius using a least squares approach, and in particular to determining a pivot center and radius of rotation for a dispenser in an agricultural application.

2. Background of the Invention

There are various types of crop irrigation techniques depending on how the water obtained from the water source is distributed within the field. In general, the goal is to supply the entire field uniformly with water, so that each plant has the amount of water it needs. While ditch irrigation, terracing and overhead irrigation have been and continue to be used as irrigation techniques, center pivot irrigation has become a popular method by which to irrigate crop fields due in part to the efficiencies of the planting in crop circles.

Center pivot irrigation consists of several segments of pipe (usually galvanized steel or aluminum) joined together and supported by trusses mounted on wheeled towers with sprinklers positioned along its length. The system moves in a circular pattern and is fed with water from the pivot point at the center of the arc. Most center pivot systems now have drops hanging from a u-shaped pipe called a gooseneck attached at the top of the pipe with sprinkler heads that are positioned a few feet (at most) above the crop, thus limiting evaporative losses. Drops can also be used with drag hoses or bubblers that deposit the water directly on the ground between crops. The crops are planted in a circle to conform to the center pivot. This type of system is also known as LEPA (Low Energy Precision Application).

It is desirable to control the application of, e.g., water or chemicals—to such a field as described above—in an efficient manner so as to minimize the amount of time taken and the amount of water (or other applicant) needed to cover the field. In order to cover a given circular field in an optimal manner, the pivot must be anchored at the center of the field, and the arm adjusted to match the radius of the field. This is not a trivial matter given that such farming fields can be several acres in area. Heretofore, to determine the center of a crop circle and anchor an irrigation arm in such a large field, the terrain would have to be carefully surveyed by the farmer. However, this can be an inefficient and time consuming procedure.

Accordingly, there is a need for an improved system and method for determining the center and irrigation radius for a center pivot irrigation system.

BRIEF SUMMARY OF THE INVENTION

A system and method for determining the center point of rotation of a moveable dispenser is disclosed. In one embodiment, a method include providing a position determination system mounted on a vehicle, and driving the vehicle along a portion of a path created by the dispenser's movement. The method may further include collecting position data for the vehicle as it moves along a portion of the path, and processing this position data to determine the center of rotation of the moveable dispenser by a method of least squares.

Other aspects, features, and techniques of the invention will be apparent to one skilled in the relevant art in view of the following detailed description of the invention.

DETAILED DESCRIPTION OF EXEMPLARY EMBODIMENTS

A system and method for determining the center and radius based on a least squares approach is disclosed. One aspect of the invention is to alleviate the task of determining the center and irrigation radius of a center pivot irrigation system. In one embodiment, a farmer drives through a given arc of a circular field in question and periodically takes position measurements. While in one embodiment a global positioning system (GPS) receiver may be used to collect the position measurements, it should equally be appreciated that other means of location/position measurement may similarly be used. While for discussion purposes the following description is provided in terms of GPS, it should equally be appreciated that GLONASS, Galileo, or any other GNSS (Global Navigation Satellite System) may similarly be used. The position measurements may then be used to calculate the radius and center of the arc, and therefore that of the entire circular field. In another embodiment, a Least-Squares Algorithm is used to estimate the best-fitting center and radius given the set of position measurements input by the farmer.

In another embodiment, a vehicle (e.g., a tractor) is driven along the arc following a portion of a predefined path which has been marked by the dispenser's wheels. As the vehicle moves along this arc, the GPS receiver affixed thereto may collect location data. However, GPS data is collected in three dimensions, while the least squares approach described herein involves a two-dimensional set of equations. Therefore, in one embodiment the position information is transformed into the East-North-UP (ENU) coordinate system prior to applying the least squares estimations described herein. This coordinate system consists of axes pointing to the East and to the North, and the local Up direction at the position of the unit. The Up direction is defined as being perpendicular to the local horizontal plane. Since the nature of a typical farm field is such that the Up coordinates do not vary by a large amount, the estimation of having a flat field is acceptable and will lead to a good center position. In order to transform the 3D geodetic position into the ENU frame, an origin (hereinafter "LTP") must be chosen, which in one embodiment may be one of the collected points.

Figure 1:
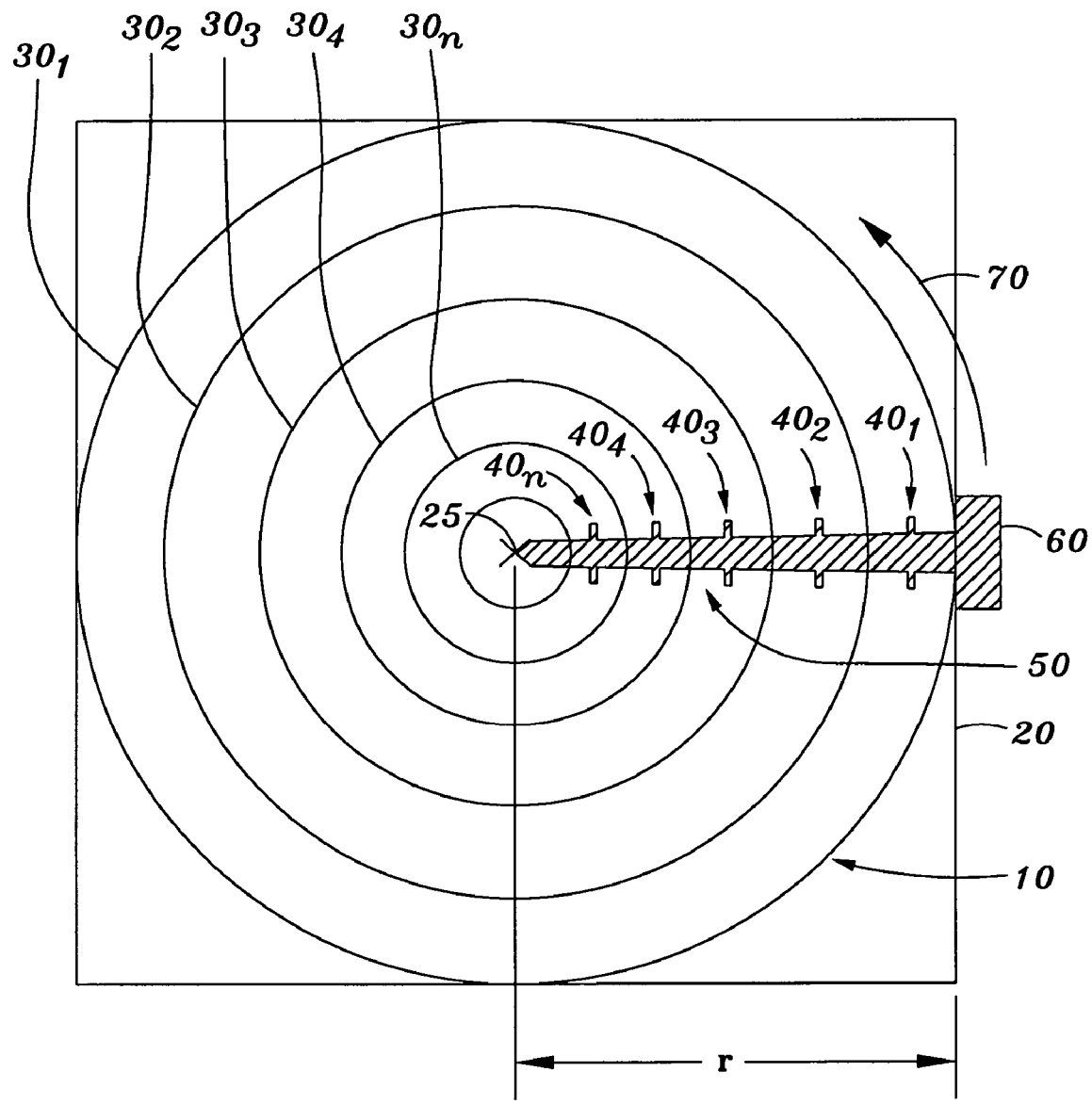
FIG. 1 depicts a circular crop field to which one or more aspects of the invention may be applied.

Referring now to the figures, FIG. 1 depicts one embodiment of a center pivot irrigation system. In this embodiment, the circular field 10 to be irrigated is bounded by a square edge 20. The field 10 is planted in circles having rows $30_1$–$30_n$ of crops with the wheels $40_1$–$40_n$ of the irrigator 50 being oriented between the crop ruts. The irrigator is in turn attached to a fixed pivot point, 25, at the center of the field. In one embodiment, the vehicle 60 follows the planting rut from the previous year's crop as a way of estimating the path 70 to follow. Moreover, it should be noted that the radius, r, of path 70 is equal to the length of the irrigation system 50 and that path 70 may be any path reasonably concentric thereto.

Figure 2:
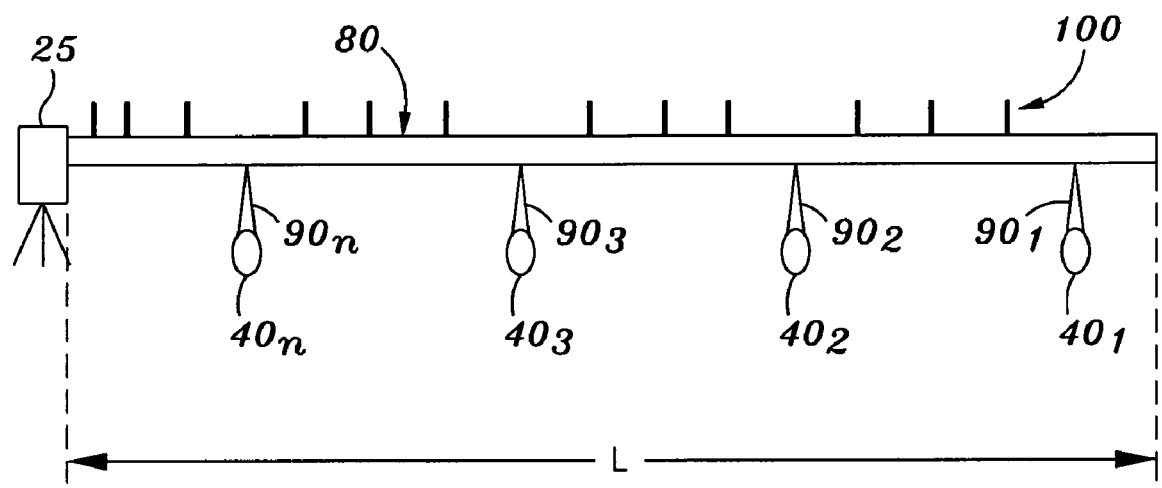
FIG. 2 depicts a pivot-based moveable dispenser which may be used in connection with the invention.

FIG. 2 depicts one embodiment of the irrigator 50. In this embodiment, the irrigator 50 consists of a long metal arm 80 comprised of segments of pipe—attached to a fixed, central pivot point 70. The metal arm 80 is supported by trusses $90_1$–$90_n$ mounted on wheels $40_1$–$40_n$. The metal arm 80 further includes a plurality of spigots, 100, which may be used to apply a substance (e.g., water, pesticides, etc.), to the field 10. As previously mentioned, the wheels 100 may be oriented such that they lie between the ruts of the planted crops. Moreover, metal arm 80 has a length, L, which in one embodiment is approximately equal to the radius, r, of path 70.

Figure 3:
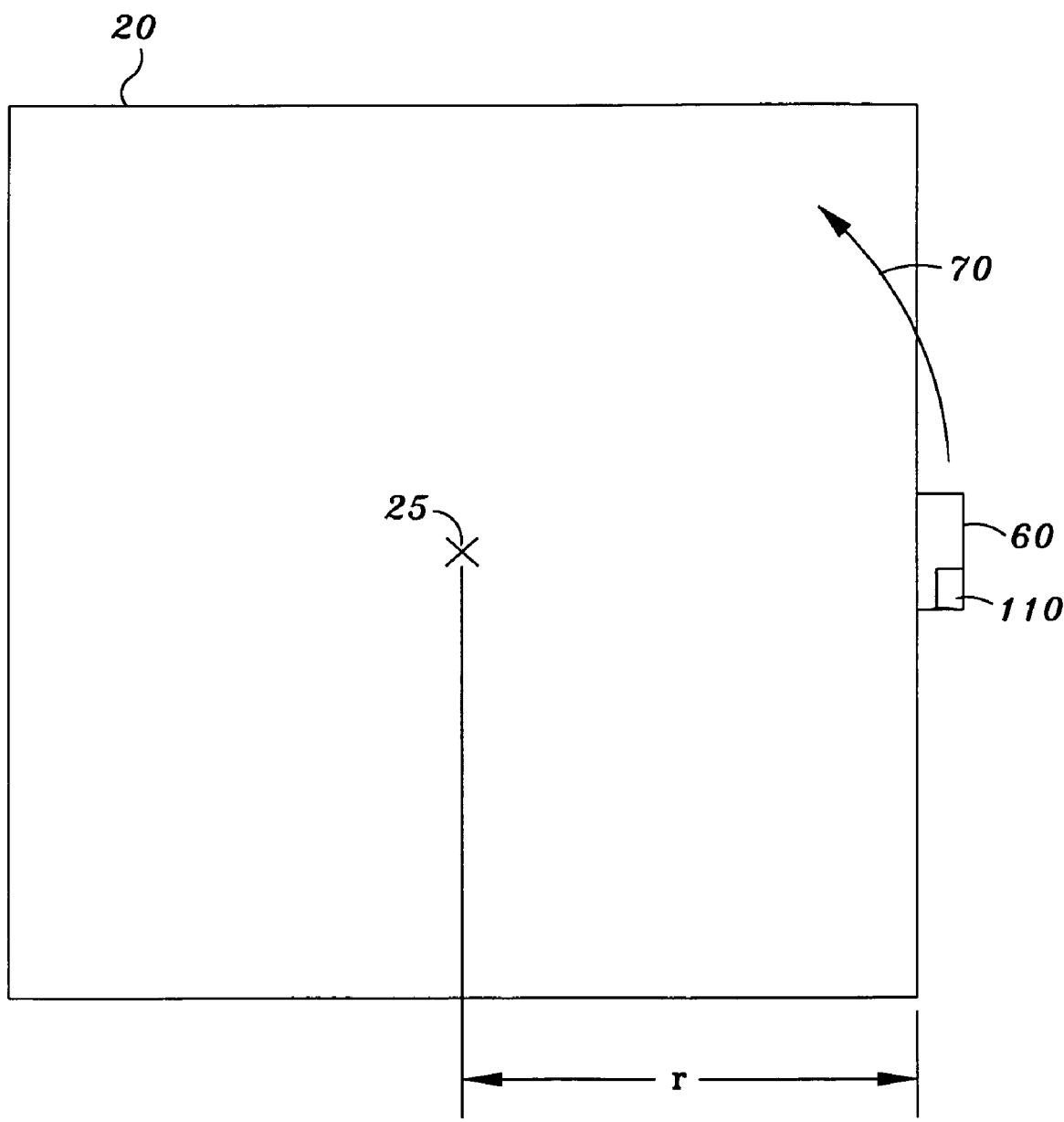
FIG. 3 is a simplified diagram showing one embodiment of a path of the dispenser of FIG. 2.

Referring now to FIG. 3, depicted is the square edge 20 of field 10 of FIG. 1 before rows $30_1$–$30_n$ of crops are planted. As mentioned above, one aspect of the invention is to use a least squares estimation to determined the location of the pivot point 25 and radius, r. A good estimate of the pivot point 25 allows the user to create a map to guide the tractor and planting crops more effectively. In one embodiment, pivot point 25 and radius, r may be determined by affixing detector 110 (e.g., GPS receiver) to vehicle 60. As vehicle 60 moves along path 70, position measurements for detector 140 may be used to determine both the pivot point 25 and radius, r, as will described in more detail below. While path 70 may be located at any radius from the pivot point 25, in one embodiment is in close proximity to any of the tracks previously created an irrigation/fertilizing system.

Details of Linearized Least-Squares Method

Once sufficient position data has been collected, both the pivot point 25 and radius r may be computed using a Least Squares Estimation. In one embodiment, this estimation is based on a linearized approach. In the following description, N denotes the number of collected data points and $(x_0, y_0)$ denotes the location of the origin of coordinates. Let i vary from 0, . . . , N and denote the index of each data point in the list so collected.

The equation of a circle with center at $(x_0, y_0)$ and radius r is:

$$(x-x_0)^2 + (y-y_0)^2 = r^2. \quad (1)$$

Expand the left-hand side of the equation to get:

$$(x^2+y^2) - 2(xx_0+yy_0) + x_0^2 + y_0^2 = r^2. \quad (2)$$

Manipulating equation (2) we can get a linear equation:

$$A(x^2+y^2) + Bx + Cy = r^2, \text{ where} \quad (3)$$

$$A = \frac{1}{r^2 - (x_0^2+y_0^2)}, \quad B = \frac{-2x_0}{r^2 - (x_0^2+y_0^2)}, \quad C = \frac{-2y_0}{r^2 - (x_0^2+y_0^2)}. \quad (4)$$

Define a function of A,B,C (where x,y are taken to be known; e.g., data points)

$$f(A,B,C) = A(x^2+y^2) + Bx + Cy. \quad (5)$$

Therefore, by definition, the value of $f$ for a given A,B,C gives us r; (i.e. $f(A,B,C) = r^2$). The Jacobian, or gradient, $\nabla f$, is given by $$J = \left[\frac{\partial f}{\partial A} \frac{\partial f}{\partial B} \frac{\partial f}{\partial C}\right]. \quad (6)$$

The gradient $\nabla f$ of the function $f$ measures how much $f$ changes given a particular direction. Doing the partial derivatives in (6), we get $$J = [x_i^2 + y_i^2 \ x_i \ y_i], \quad (7)$$

which results in a linear equation in three unknowns (i.e. A,B,C). J is a N×3 matrix where N is the number of points collected. Let K be the error matrix; for our problem it is the identity matrix for this equation. The identity matrix plays the role of the number 1 for matrices (i.e., just like 2×1=2, AK=A for some matrix A).

Based on the principle of least squares, the most-probable values of the corrections to the unknowns are obtained by minimizing the sum of the squares of the weighted observation residuals according to:

$$\begin{bmatrix} A \\ B \\ C \end{bmatrix} = (J^T J)^{-1} J^T K. \quad (8)$$

Using the collected data transformed to the ENU coordinate system and the previous equations we can calculate A, B, and C which will give us r and $(x_0, y_0)$ based on the following equation:

$$x_0 = -B/(2A), \ y_0 = -C/(2A), \ r = mt;epmrl;\sqrt{4italA + Bmedsup2resetital + Cmedsup2resetrlxmx}/(2A). \quad (9)$$

The center coordinates $(x_0, y_0)$ are the East and North components of the center and we can use the LTP origin position to transform these values into geodetic coordinates using a GPS coordinate transformation function. The radius of the circle is of course given by r.

Iterative Least-Squares Estimation

Rather than using a linearized approach, the Least-Squares Estimation may instead rely on an iterative approach. However, with the iterative least-squares estimation an accurate starting estimate of the center coordinates $(x_0, y_0)$ and radius, r, are needed. In one embodiment, one may use the previous method of Linearized Least Squares to determine an initial solution. In another embodiment, a plurality of data points (e.g., 3) may be taken on one of the tracks and fit to a curve. Alternatively, one may take a position fix driving nearby the pivot point.

It is of course desirable to minimize the error in our unknowns. Taking the unknown radius, for example, the ith data value input by the user for the radius is $r_i$, where r is the "true" value of the radius. In this case, $d_i = r_i - r$ may then represent the error between the data entry value and the true value. Given the equation for a circle is Equation (1), the equation for $r_i$ would be $$r_i = \sqrt{(x_i - x_0)^2 + (y_i - y_0)^2}. \quad (10)$$

and the error $d_i$ can be written as $$d_i = r_i - r = \sqrt{(x_i - x_0)^2 + (y_i - y_0)^2} - r. \quad (11)$$

To minimize the error, $d_i$ such that the determined radius, $r_i$, closely approximates r, the Jacobian of Equation (11) may be formed, which will be an N×3 matrix where N is the number of data points taken. Each row will have the values $$\frac{\partial d_i}{\partial x_0} = -\frac{(x_i - x_0)}{r}, \frac{\partial d_i}{\partial y_0} = -\frac{(y_i - y_0)}{r}, \frac{\partial d_i}{\partial z_0} = -\frac{(z_i - z_0)}{r}. \quad (12)$$

The error matrix, K, is the difference in the radius and the calculated radius so it is an N×1 (i.e. N rows and 1 column) matrix with each row as follows:

$$K_{i,1} = -\sqrt{(x_i - x_0)^2 + (y_i - y_0)^2} - r \quad (13)$$

Based on the principle of least squares once again, the most-probable value of the corrections of the unknowns is obtained by minimizing the sum of the squares of the weighted observation residuals according to:

$$\begin{bmatrix} \Delta x \\ \Delta y \\ \Delta r \end{bmatrix} = (J^T J)^{-1} J^T K \quad (14)$$

The iteration proceeds by adding $\Delta x$, $\Delta y$, and $\Delta r$, respectively, to the initial values $(x_0, y_0)$ and $r_0$:

$$x_{new} = x_0 + \Delta x, \ y_{new} = y_0 + \Delta y, \ z_{new} = z_0 + \Delta z \quad (15)$$

The solution may then be iterated by reusing the new values as the new estimates $(x_0, y_0)$ and $r_0$ until the magnitude of the delta values falls below some predetermined threshold, which in one embodiment may range from approximately 0.1 mm to approximately 10 cm.

Figure 4A:
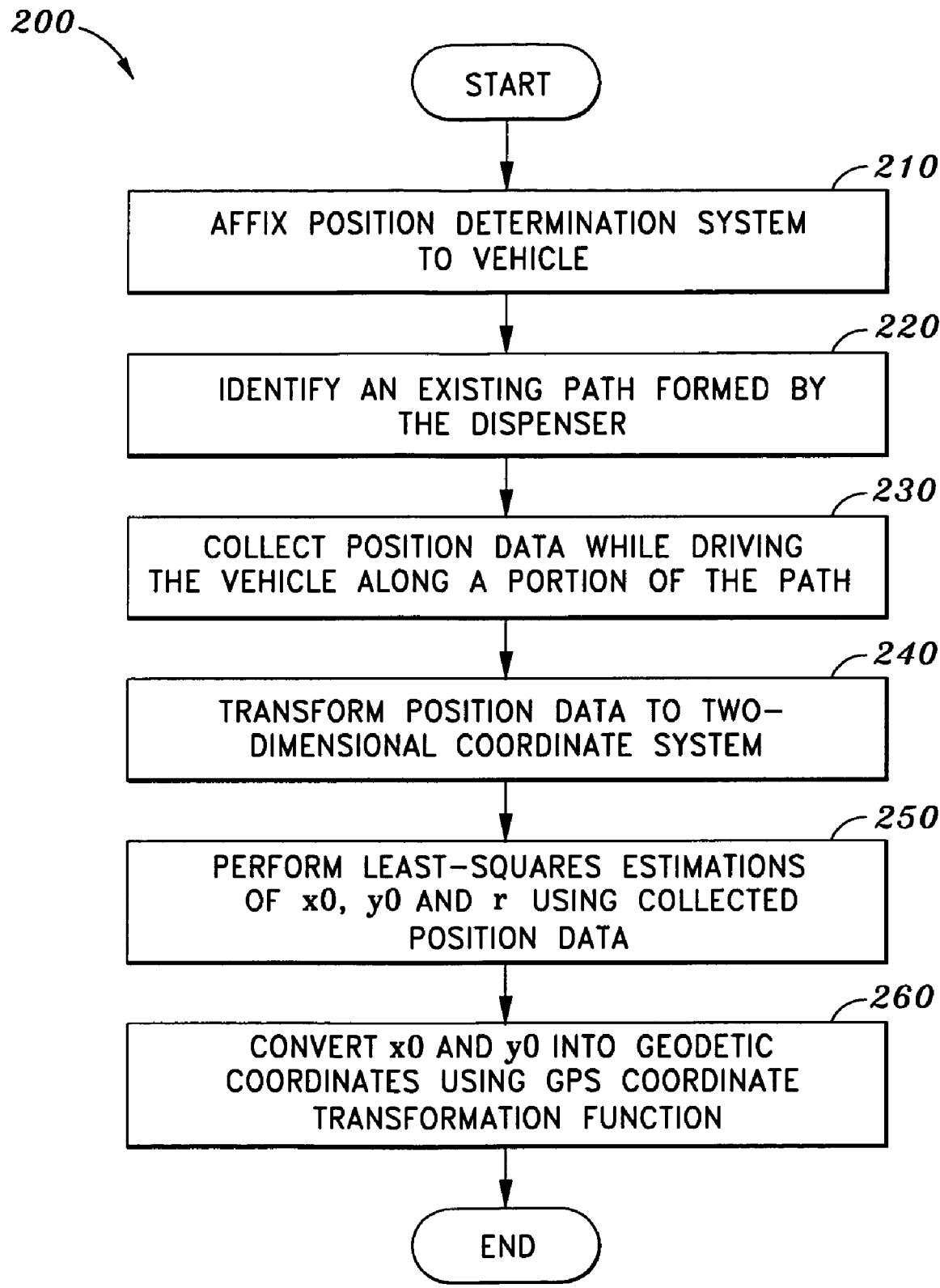
FIGS. 4A–4B are embodiments of flow diagrams for how one or more aspects of the invention may be carried out.

Referring now to FIG. 4A, depicted is one embodiment of a process 200 for carrying out one or more aspects of the invention using a linearized least squares approach. In the embodiment of FIG. 4A, process 200 begins at block 210 with a position determination system (e.g., GPS receiver) being affixed to a vehicle, which in one embodiment may be a tractor or other farm vehicle. Then, at block 220, an existing path may be identified for the vehicle to follow as a rough guideline. In one embodiment, this path is demarcated by the wheel impressions from a dispenser system.

Process 200 continues to block 230 where position data is collected as the vehicle follows the rough outline of the preexisting path. As mentioned above, these position data points may be comprised of GPS (or GLONASS, Galileo, GNSS, etc.) coordinates taken every X number of feet, yards, seconds, etc. It should further be appreciated that these data points need be collected only over some sub-set of the entire circular path, such as one-half, one-quarter, etc. In one embodiment, the principles of the invention improve both the speed and simplicity of data collection.

Either after or while the position data points are being collected, process 200 further includes the transformation of the position data into a two-dimensional coordinate system (block 240). Since GPS data is collected in three dimensions, it may be necessary to transform this position data into, for example, ENU coordinate system as previously discussed. Moreover, since the nature of a typical farm field is such that the Up coordinate does not vary much, the field may be assumed to be essentially flat over the full set of data points collected.

Once the data has been transformed to some two-dimensional system, at block 250 those values may be applied to Equations (1)–(9) to calculate the values A, B, and C, and in turn the desired pivot center $(x_0, y_0)$ and radius, r. Finally, the computed pivot center coordinates may be optionally converted back into GPS coordinates.

Figure 4B:
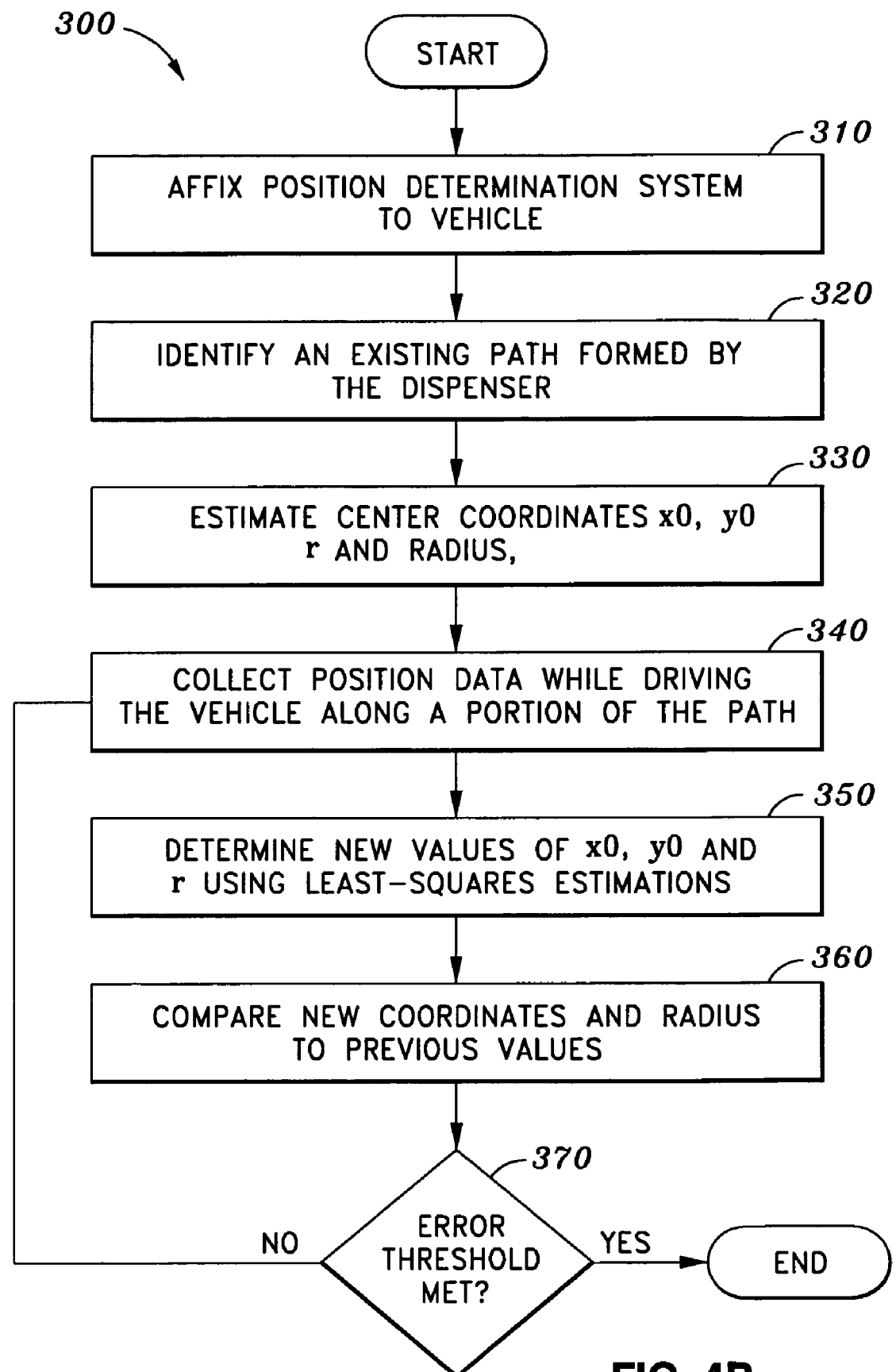

Referring now to FIG. 4B, depicted is one embodiment of a process 300 for carrying out one or more aspects of the invention using an iterative least squares approach. As with process 200, in the embodiment of FIG. 4B process 300 begins at block 310 with a position determination system (e.g., GPS receiver) being affixed to a vehicle, which in one embodiment may be a tractor or other farm vehicle. Then, at block 320, an existing path may be identified for the vehicle to follow as a rough guideline. In one embodiment, this path is demarcated by the wheel impressions from a dispenser system.

Process 300 continues to block 330 where the starting pivot center $(x_0, y_0)$ and radius, r, are to be estimated. Process 300 continues to block 340 where position data is collected as the vehicle follows the rough outline of the preexisting path. As mentioned above, these position data points may be comprised of GPS coordinates taken every X number of feet, yards, seconds, etc. It should further be appreciated that these data points need be collected only over some sub-set of the entire circular path, such as one-half, one-quarter, etc.

Regardless how often or over what metric the data points are collected, at block 350 new values for $(x_0, y_0)$ and r may be calculated using Equations (10)–(15). These new value may then be compared to the previous coordinate and/or radius values to determine the magnitude of the delta for the current iteration (block 360). Thereafter, at block 370, a determination may be made as to whether the magnitude of the change between the old coordinate estimate and the new coordinate estimate is below a predetermined error threshold. In one embodiment, this predetermined threshold is between approximately 0.1 mm and approximately 10 cm. If it is determined at block 370 that the predetermined threshold has been met, process 300 ends and the then—new values for $(x_0, y_0)$ and radius r may be taken as the true coordinates of the pivot center and radius. If, on the other hand, the predetermined error threshold has not been met, then process 300 may loop back to block 340 where additional position data is collected for a new iteration of calculations.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, instead of GPS positioning, GLONASS, Galileo, or any other GNSS (Global Navigation Satellite System) positioning technology may similarly be used.

What is claimed is:

1. A method of determining the center point of rotation of a moveable dispenser, said dispenser having at least one path created by its wheels, comprising:

providing a position determination system mounted on a vehicle;

driving said vehicle along a portion of said path created by said dispenser movement;

collecting position data for said vehicle along said portion of the path;

processing said position data to determine the center of rotation of said moveable dispenser by a method of least squares.

2. The method of claim 1, wherein said moveable dispenser is one of an irrigation apparatus and a fumigation apparatus.

3. The method of claim 1, wherein providing the position determination system comprises mounting a positioning system on said vehicle, wherein said positioning system is selected from the group consisting of a Global Positioning System, GLONASS, Galileo and Global Navigation Satellite System.

4. The method of claim 1, wherein driving said vehicle comprises driving said vehicle along a portion of said path, where said portion is no greater than one-half of a length of said path.

5. The method of claim 1, wherein driving said vehicle comprises driving said vehicle along a portion of said path, where said portion is no greater than one-quarter of a length of said path.

6. The method of claim 1, wherein collecting position data comprises collecting a plurality of global position system coordinates for said vehicle during said driving along said portion of said path.

7. The method of claim 1, further comprising processing said position data to determine a radius of said path by said method of least squares.

8. The method of claim 1, wherein processing said position data comprises processing said position data to determine the center of rotation of said dispenser by a method of linearized least squares estimation.

9. The method of claim 8, further comprising transforming said position data to a two-dimensional coordinate system prior to said processing the position data.

10. The method of claim 1, wherein processing said position data comprises processing said position data to determine the center of rotation of said dispenser by a method of iterative least squares estimation.

11. The method of claim 10, wherein processing said position data comprises:
 estimating an initial pivot center and an initial radius;
 calculating a new pivot center and a new radius using said method of iterative least squares estimation;
 comparing said initial pivot center to said new pivot center; and
 determining if an error threshold has been met based on said comparing.

12. A system of determining the center point of rotation of a moveable dispenser comprising:
 a dispenser having at least one path created by its wheels;
 a position determination system mounted on a vehicle, wherein said vehicle is to move along a portion of said path created by said dispenser movement; and,
 a processor in communication with said position determination system, said processor to,
  collect position data for said vehicle along said portion of the path, and
  process said position data to determine the center of rotation of said moveable dispenser by a method of least squares.

13. The system of claim 12, wherein said moveable dispenser is one of an irrigation apparatus and a fumigation apparatus.

14. The system of claim 12, wherein said position determination system is selected from the group consisting of a Global Positioning System, GLONASS, Galileo and Global Navigation Satellite System a global positioning system.

15. The system of claim 12, wherein said portion of said path is no greater than one-half of a length of said path.

16. The system of claim 12, wherein said portion of said path is no greater than one-quarter of a length of said path.

17. The system of claim 12, wherein said position data comprises a plurality of global position system coordinates for said vehicle collected while said vehicle moves along said portion of said path.

18. The system of claim 12, wherein to process said position data to determine the center of rotation of said dispenser, said processor utilizes a method of linearized least squares estimation.

19. The system of claim 18, wherein said processor is further to transform said position data to a two-dimensional coordinate system prior to said processing the position data.

20. The system of claim 12, wherein to process said position data to determine the center of rotation of said dispenser, said processor utilizes a method of iterative least squares estimation.

21. The system of claim 20, wherein to process said position data, said processor is to,
 estimate an initial pivot center and an initial radius,
 calculate a new pivot center and a new radius using said method of iterative least squares estimation,
 compare said initial pivot center to said new pivot center, and
 determine if an error threshold has been met based on said comparing.

22. A system of determining the center point of rotation of a moveable dispenser comprising:
 a dispenser having at least one path created by its wheels;
 a position determination means coupled to a vehicle to collect position data for said vehicle while said vehicle moves along a portion of said path created by said dispenser movement; and
 processing means to determine the center of rotation of said moveable dispenser using a method of least squares.

23. The system of claim 22, wherein said dispenser is one of an irrigation apparatus and a fumigation apparatus.

24. The system of claim 22, wherein said position data is data from one of a Global Positioning System, GLONASS, Galileo and Global Navigation Satellite System.

25. The system of claim 22, wherein said portion of said path is no greater than one-half of a length of said path.

26. The system of claim 22, wherein said portion of said path is no greater than one-quarter of a length of said path.

27. The system of claim 22, wherein said position data comprises a plurality of global position system coordinates for said vehicle collected while said vehicle moves along said portion of said path.

28. The system of claim 22, wherein said method of least squares is a method of linearized least squares estimation.

29. The system of claim 28, wherein said processing means further to transform said position data to a two-dimensional coordinate system prior to processing the position data.

30. The system of claim 22, wherein said method of least squares is a method of iterative least squares estimation.

31. The system of claim 30, wherein said processing means is further to,
 estimate an initial pivot center and an initial radius,
 calculate a new pivot center and a new radius using said method of iterative least squares estimation,
 compare said initial pivot center to said new pivot center, and
 determine if an error threshold has been met based on said comparing.

* * * * *